(12) United States Patent
Wu

(10) Patent No.: US 6,701,826 B2
(45) Date of Patent: Mar. 9, 2004

(54) ELECTRIC COFFEE MAKER FOR SELECTIVELY BREWING ESPRESSO COFFEE AND AMERICANO COFFEE

(75) Inventor: Tsan-Kuen Wu, Tainan Hsien (TW)

(73) Assignee: Eupa International Corporation, Las Vegas, NV (US)

( * ) Notice: Subject to any disclaimer, the term of this patent is extended or adjusted under 35 U.S.C. 154(b) by 29 days.

(21) Appl. No.: 10/184,730

(22) Filed: Jun. 28, 2002

(65) Prior Publication Data

US 2004/0000237 A1 Jan. 1, 2004

(51) Int. Cl.$^7$ ................................................ A47J 31/00
(52) U.S. Cl. ............................ 99/305; 99/307; 99/300
(58) Field of Search .......................... 99/300, 302 R, 99/305, 306, 307, 317, 318, 319, 322, 323

(56) References Cited

U.S. PATENT DOCUMENTS 2,451,195 A * 10/1948 Brown ..................... 99/302 R
4,064,795 A * 12/1977 Ackerman ................... 99/304
6,543,335 B1 * 4/2003 Lassota .................... 99/305 X

* cited by examiner

Primary Examiner—Reginald L. Alexander
(74) Attorney, Agent, or Firm—Ladas & Parry

(57) ABSTRACT

An electric coffee maker includes a removable filtering member for receiving ground coffee beans. A selection unit can be actuated to operate the assembly of a water-supplying device, a flow control unit, and a dispensing member in a selected one of a single-stage Espresso coffee mode and a two-stage Americano coffee mode. In the Espresso coffee mode, hot water is supplied into the filtering member via a main water path for discharging brewed coffee. In the Americano coffee mode, hot water is supplied twice. The first supply of the hot water flows into the filtering member via the main water path so as to discharge brewed coffee into a cup. The second supply of the hot water flows into the cup via a secondary water path and a water passage space in the dispensing member that is located outside the filtering member.

7 Claims, 6 Drawing Sheets

ELECTRIC COFFEE MAKER FOR SELECTIVELY BREWING ESPRESSO COFFEE AND AMERICANO COFFEE

BACKGROUND OF THE INVENTION

1. Field of the Invention

This invention relates to an electric coffee maker, and more particularly to an electric coffee maker for selectively brewing Espresso coffee and Americano coffee.

2. Description of the Related Art

A conventional electric coffee maker is designed to brew only one of Espresso coffee and Americano coffee. When one desires to brew these two kinds of coffee, it is necessary to have two coffee makers of different types, which is inconvenient.

SUMMARY OF THE INVENTION

The object of this invention is to provide an electric coffee maker, which can brew selectively Espresso coffee and Americano coffee.

According to this invention, an electric coffee maker includes a removable filtering member for receiving ground coffee beans. A selection unit can be actuated to operate the assembly of a water-supplying device, a flow control unit, and a dispensing member in a selected one of a single-stage Espresso coffee mode and a two-stage Americano coffee mode. In the Espresso coffee mode, hot water is supplied into the filtering member via a main waterpath for discharging brewed coffee. In the Americano coffee mode, hot water is supplied twice. The first supply of the hot water flows into the filtering member via the main water path so as to discharge brewed coffee into a cup. The second supply of the hot water flows into the cup via a secondary water path and a water passage space in the dispensing member that is located outside the filtering member.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
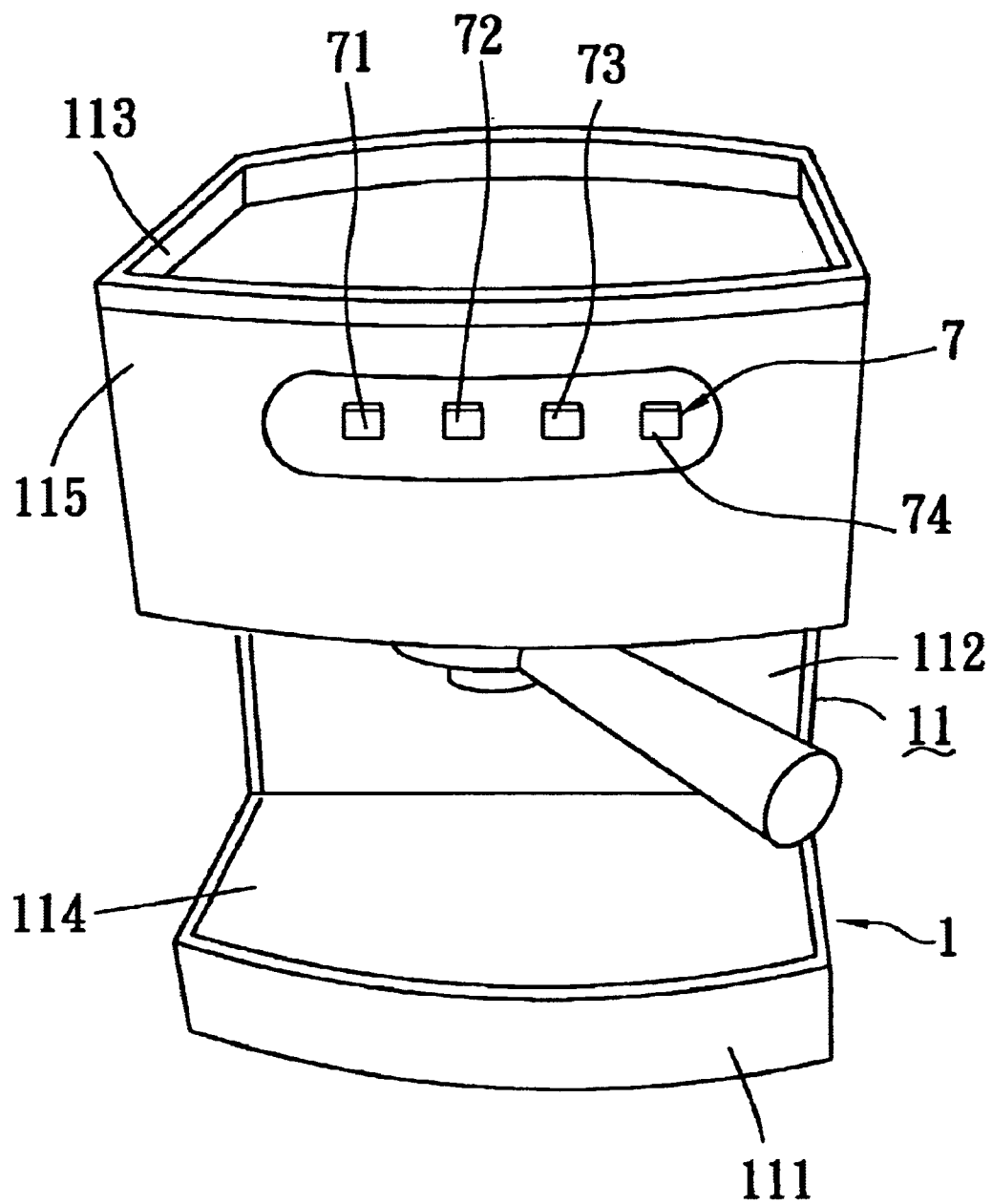
FIG. 1 is an assembled perspective of the preferred embodiment of an electric coffee maker according to this invention.
Figure 2:
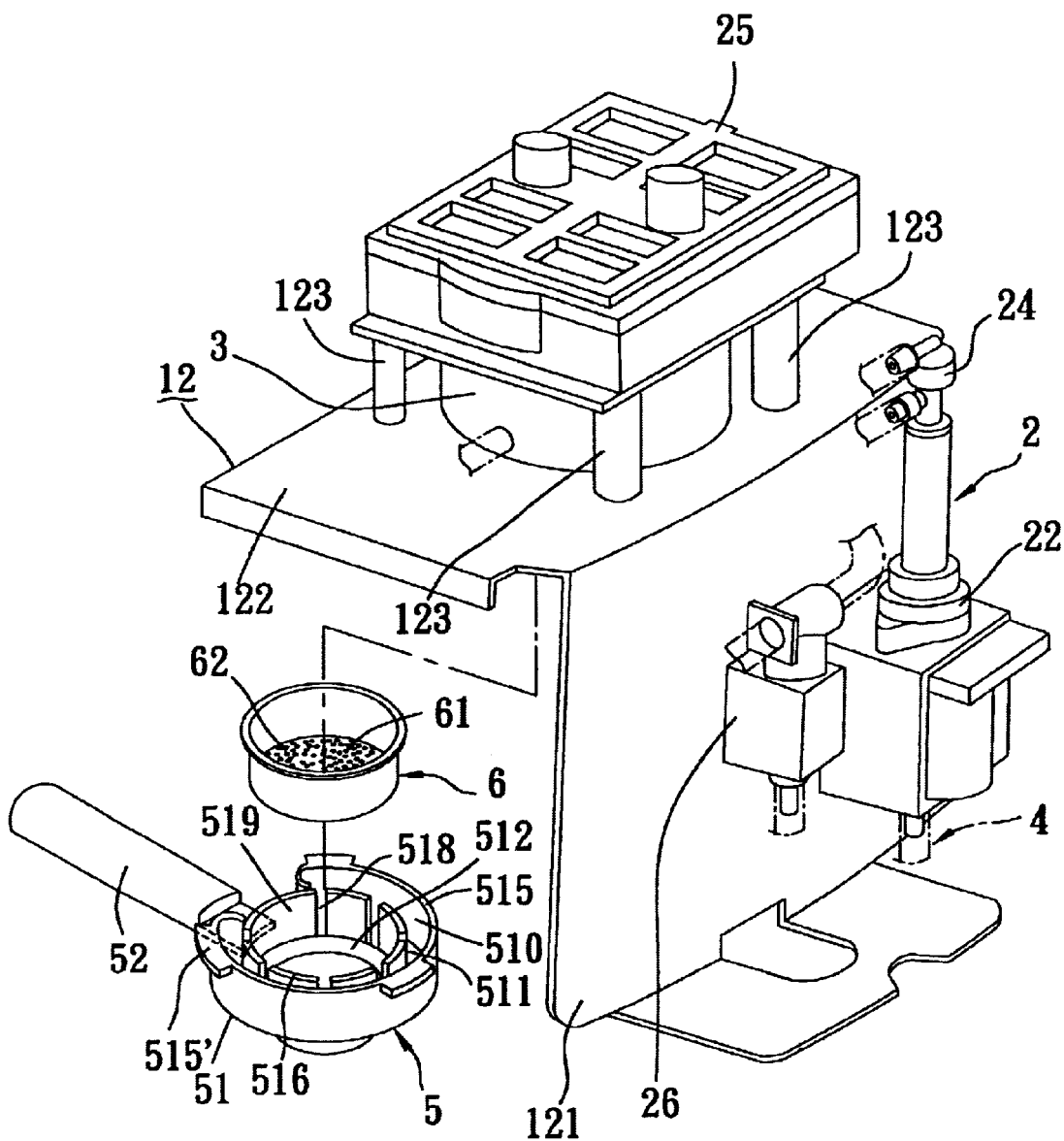
FIG. 2 is a partly exploded perspective view of the preferred embodiment, in which a housing is removed for illustrating the interior structure thereof.

Referring to FIGS. 1 and 2, the preferred embodiment of an electric coffee maker according to this invention is shown to include a base 1, a water-supplying device 2, a flow control unit 3, a conduit unit 4, a dispensing member 5, a filtering member 6, and a selection unit 7.

The base 1 has a housing 11, and a support frame 12 that is disposed within the housing 11. The housing 11 includes a horizontal bottom housing portion 111, a vertical rear housing portion 112 that is connected fixedly to a rear end of the bottom housing portion 111 at a lower end, a horizontal top housing portion 113 that is connected fixedly to an upper end of the rear housing portion 112 at a rear end, a cup receiving space 114 that is defined among the bottom, rear, and top housing portions 111, 112, 113, and a vertical front panel 115 that is attached fixedly to a front end surface of the top housing portion 113. The support frame 12 has a vertical frame portion 121, a horizontal frame portion 122 that extends integrally and forwardly from an upper end of the vertical frame portion 121, and four spaced-apart support posts 123 that are fixed on a top surface of the horizontal frame portion 122.

Figure 3:
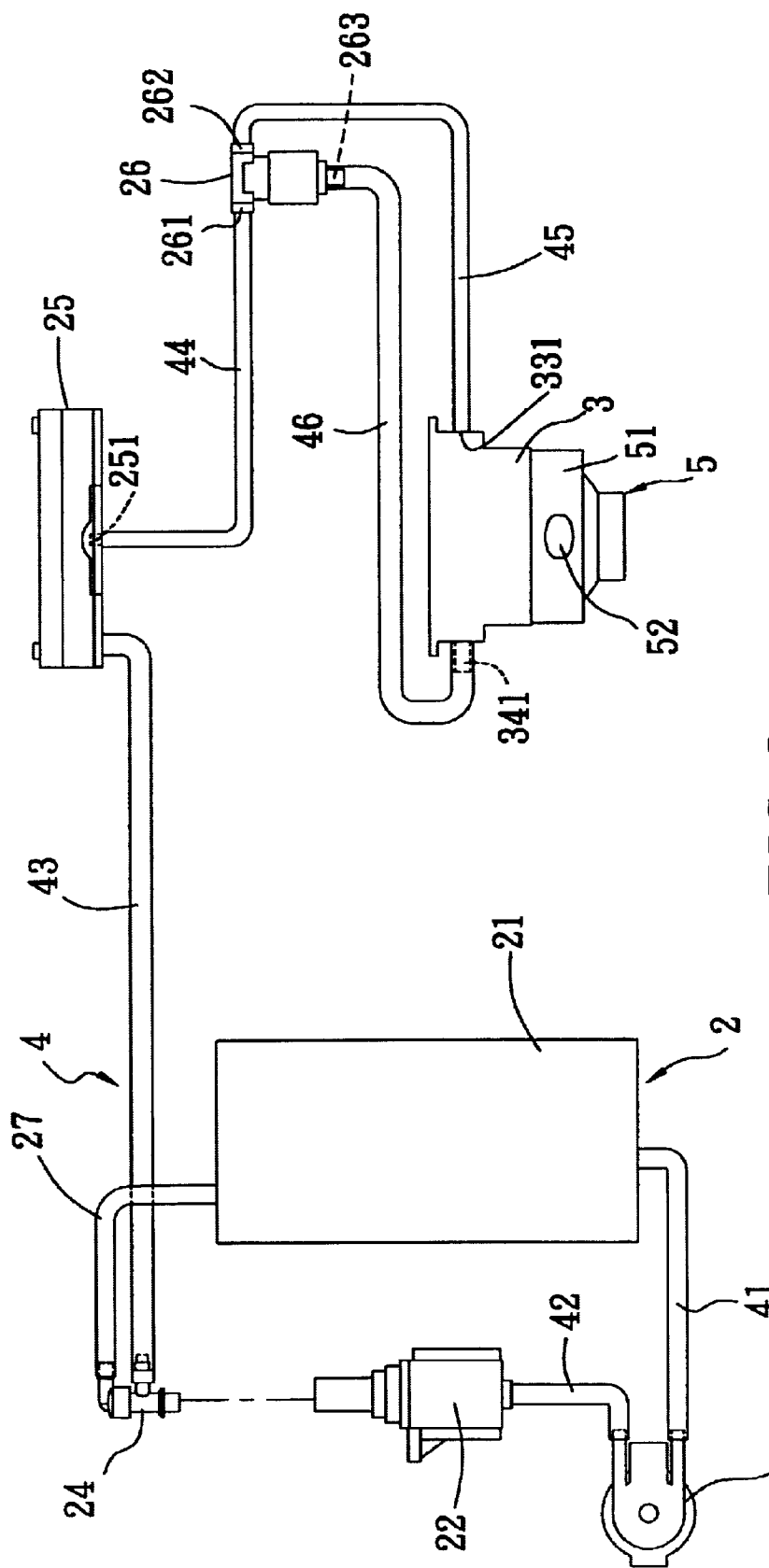
FIG. 3 illustrates a water-supplying device and a conduit unit of the preferred embodiment.

Referring to FIGS. 2 and 3, the water-supplying device 2 includes a water reservoir 21, a pump 22 that is disposed on a rear side surface of the vertical frame portion 121, a flow control valve 23 that is disposed under the pump 22 for controlling the amount of water from the reservoir 21 to the pump 22, a pressure relief valve 24 that is installed on an upper end of the pump 22, a heater 25 that is supported on the support posts 123, a three-way electromagnetic valve 26 that is disposed on the rear side surface of the vertical frame portion 121, and a flow return pipe 27 that interconnects and that is in fluid communication with the pressure relief valve 24 and the water reservoir 21. The heater 25 has a hot water outlet 251 that is formed in a central portion thereof. The three-way electromagnetic valve 26 has a hot water inlet 261, a main outlet 262, and a secondary outlet 263.

Figure 4:
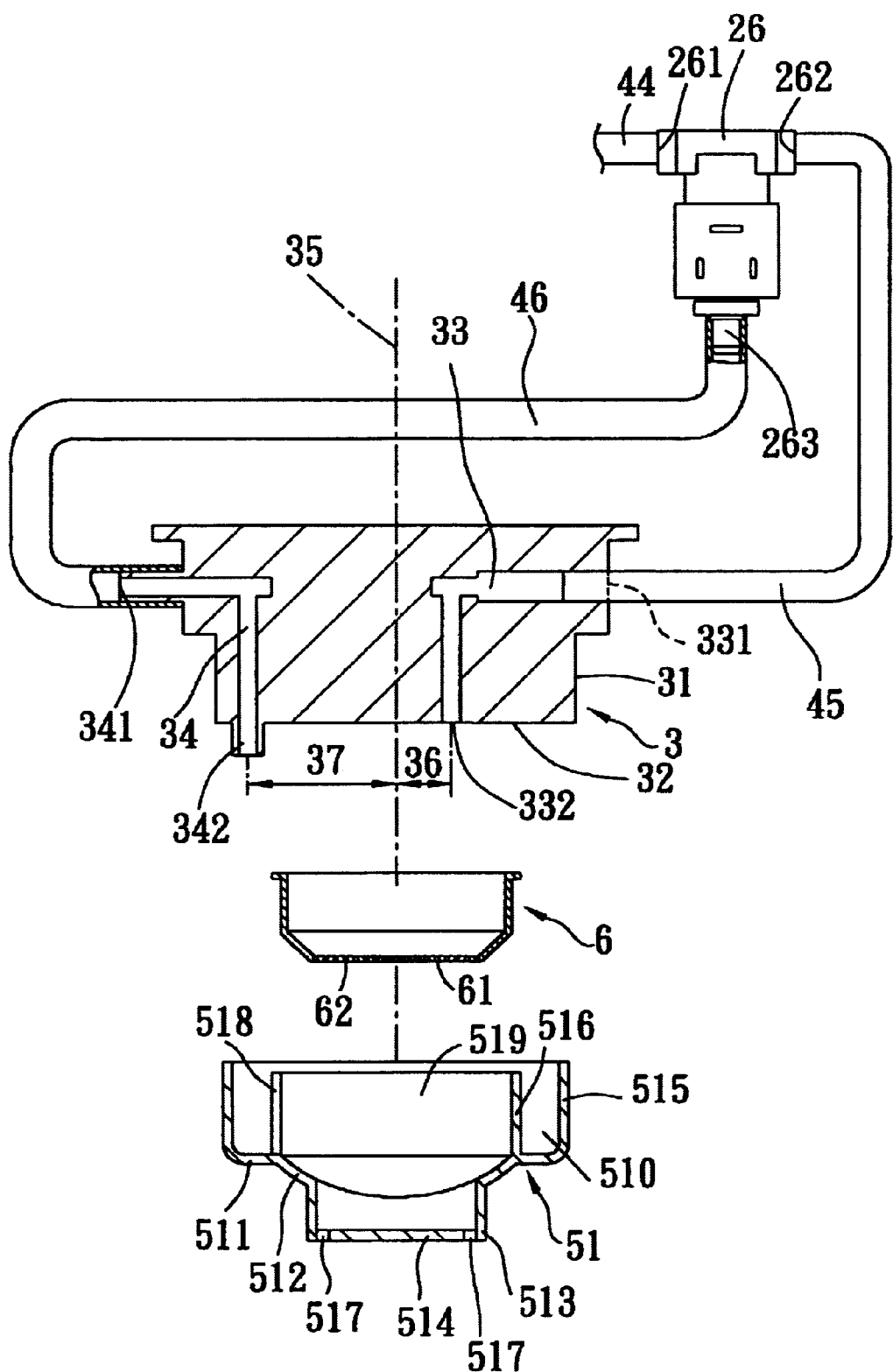
FIG. 4 is a fragmentary, partly exploded, partly sectional view illustrating a flow control unit, a dispensing member, and a filtering member of the preferred embodiment.
Figure 5:
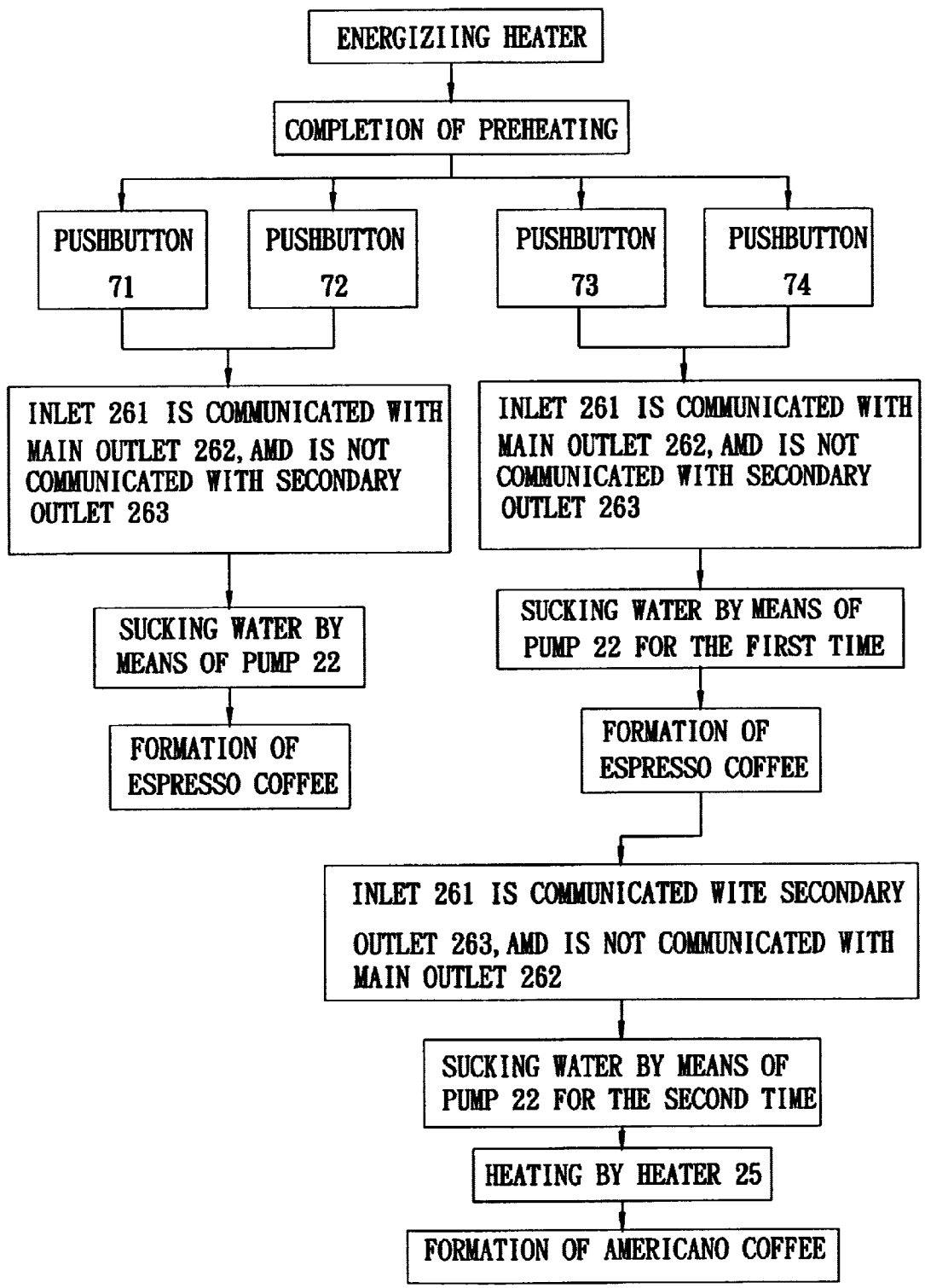
FIG. 5 is a flow diagram illustrating operation of the preferred embodiment.
Figure 6:
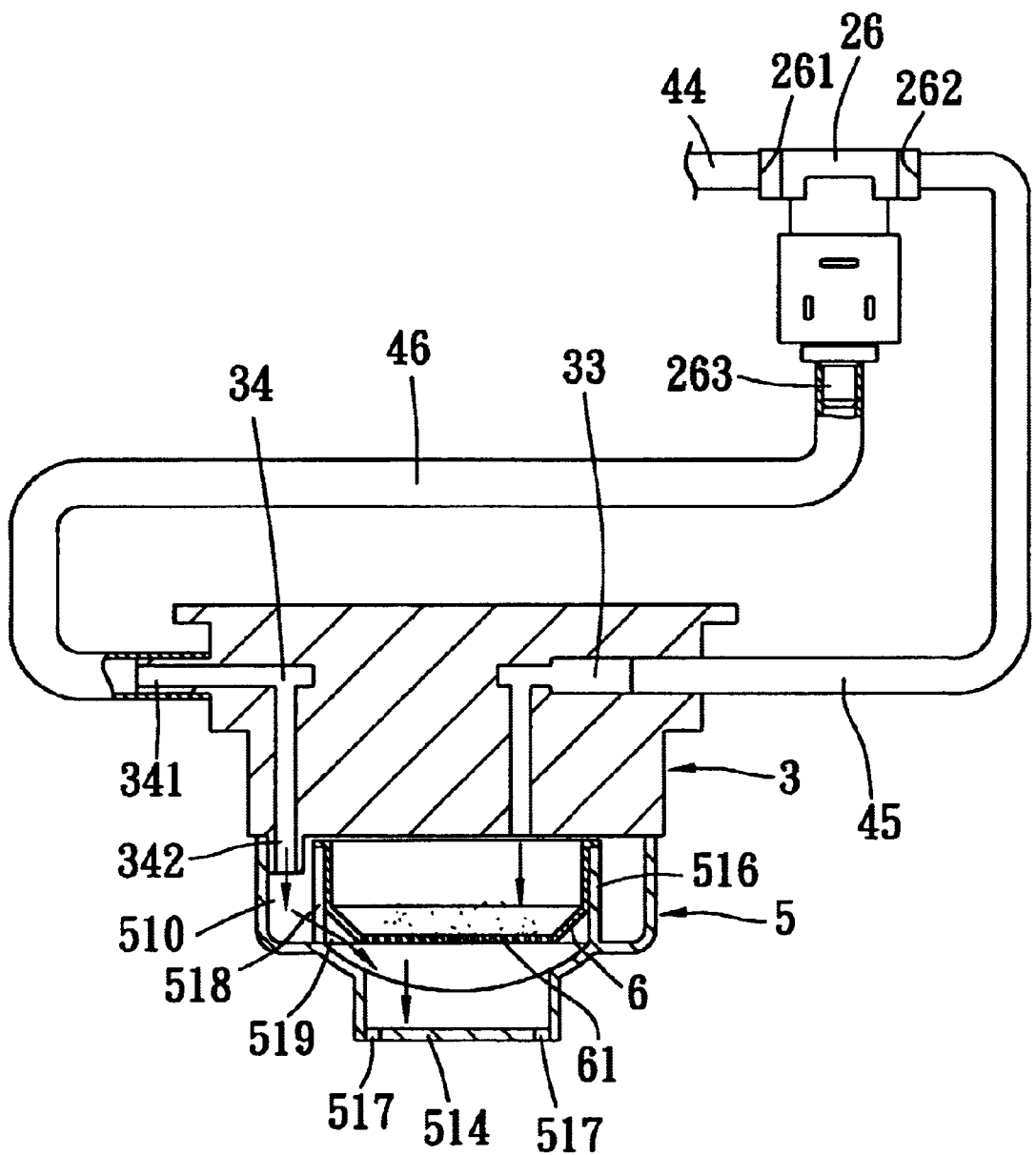
FIG. 6 is a fragmentary, assembled, partly sectional view of the flow control unit, the dispensing member, and the filtering member of the preferred embodiment.

Referring to FIGS. 3 and 4, the flow control unit 3 is disposed on a middle portion of the horizontal frame portion 122 (see FIG. 2), and is located under the heater 25. The flow control unit 3 is made of a heat-resistant metal, and has a surrounding wall 31, a bottom wall 32 formed integrally with a lower end of the surrounding wall 31, a main water path 33 formed through a right portion of the flow control unit 3, and a secondary water path 34 formed through a left portion of the flow control unit 3. Each of the main and secondary water paths 33, 34 has an inlet 331, 341 formed in the surrounding wall 31, and an outlet 332, 342 formed in the bottom wall 32. The outlet 332 of the main water path 33 is spaced apart from an axis 35 of the flow control unit 3 by a distance 36 that is smaller than a distance 37 between the outlet 342 of the secondary water path 34 and the axis 35.

The conduit unit 4 includes a first conduit 41 for interconnecting the water reservoir 21 and the flow control valve 23, a second conduit 42 for interconnecting the flow control valve 23 and the pump 22, a third conduit 43 for interconnecting the pressure relief valve 24 and the heater 25, a fourth conduit 44 for interconnecting the heater 25 and the three-way electromagnetic valve 26, a fifth conduit 45 for interconnecting the three-way electromagnetic valve 26 and the flow control unit 3, and a sixth conduit 46 for interconnecting the three-way electromagnetic valve 26 and the flow control unit 3. The fourth conduit 44 is in fluid communication with the hot water outlet 251 in the heater 25 and the hot water inlet 261 in the three-way electromagnetic valve 26. The fifth conduit 45 is in fluid communication with the main outlet 262 in the three-way electromagnetic valve 26 and the inlet 331 of the main water path 33. The sixth conduit 46 is in fluid communication with the secondary outlet 263 in the three-way electromagnetic valve 26 and the inlet 341 of the secondary water path 34.

Referring to FIGS. 2, 3, 4, and 6, the dispensing member 5 is mounted removably to a lower end portion of the flow control unit 3, and has a metal receiving portion 51 and a plastic handle 52, which has an end that is fixed to the metal receiving portion 51. The metal receiving portion 51 includes a horizontal ring plate 511 disposed around the axis 35, a bowl consisting of an annular curved upper bowl portion 512, a circular tube portion 513, and a bottom end wall 514, a vertical outer surrounding wall 515, and an annular partition unit. The partition unit includes a plurality of vertical inner walls 516, which are arranged in a circle that is surrounded by the outer surrounding wall 515. The bottom end wall 514 is formed integrally with a bottom end of the circular tube portion 513 for defining a closed end of the circular tube portion 513, and is formed with a plurality of discharge holes 517 (only two are shown in FIG. 4) therethrough. Each adjacent pair of the inner walls 516 are spaced apart from each other so as to define a space 518 therebetween. The ring plate 511 has an outer periphery that is formed integrally with a lower end of the outer surrounding wall 515, and an inner periphery that is formed integrally with lower ends of the inner walls 516. The upper bowl portion 512 extends inwardly and downwardly from the inner periphery of the ring plate 511. The circular tube portion 513 has an open upper end that is formed integrally with a lower end of the upper bowl portion 512. The outer surrounding wall 515 is formed with three radially and outwardly extending tongues 515' (see FIG. 2), whereby the dispensing member 5 is connected removably to the flow control unit 3 in a known manner. The outlet 332 of the main water path 33 is directed to a brewing space 519 that is defined within the annular partition unit that consists of the inner walls 516. The outlet 342 of the secondary water path 34 is directed to a water passage space 510 that is defined between the outer surrounding wall 515 and the inner walls 516.

The filtering member 6 is placed within the brewing space 519 for receiving ground coffee beans therein. A filtering plate 61 is disposed at a bottom end of the filtering member 6, and has a plurality of filtering holes 62.

Referring to FIG. 1, the selection unit 7 includes a first Espresso pushbutton 71, a second Espresso pushbutton 72, a first American pushbutton 73, a second American pushbutton 74, and a circuit board (not shown). The pushbuttons 71, 72, 73, 74 are mounted operably on the front panel 115. The circuit board (not shown) is disposed within the top housing portion 113, and is connected electrically to the pushbuttons 71, 72, 73, 74.

Referring to FIGS. 1, 3, 5, and 6, when it is desired to brew coffee, the coffee maker is energized first so as to preheat the heater 25. Subsequently, a certain amount of ground coffee beans are placed into the filtering member 6. The filtering member 6 is inserted into the brewing space 519 in the dispensing member 5. Finally, the dispensing member 5 is mounted to the flow control unit 3.

Upon pressing the first Espresso pushbutton 71, the assembly of the water-supplying device 2, the flow control unit 3, and the dispensing member 5 is controlled to operate in a single-stage Espresso coffee mode. That is, the three-way electromagnetic valve 26 is activated so as to permit water flow between the hot water inlet 261 and the main outlet 262 and so as to prevent water flow between the hot water inlet 261 and the secondary outlet 263. At this time, the pump 22 forces a first amount of water from the reservoir 21 into the brewing space 519 via a flow path of the first conduit 41, the flow control valve 23, the second conduit 42, the pump 22, the pressure relief valve 24, the third conduit 43, the heater 25, the fourth conduit 44, the three-way electromagnetic valve 26, the fifth conduit 45, and the main water path 33 in the flow control unit 3. The brewed Espresso coffee drips through the discharge holes 517 in the dispensing member 5 into a cup (not shown) placed on the bottom housing portion 111.

Upon pressing the second Espresso pushbutton 72, the assembly of the water-supplying device 2, the flow control unit 3, and the dispensing member 5 is also controlled to operate in the Espresso coffee mode. Unlike the operation resulting from actuation of the first Espresso pushbutton 71, the pump 22 forces an amount of water that is double the first amount from the water reservoir 21 into the brewing space 519. It is noted that the amount of ground coffee beans used is also double that used in the aforesaid Expresso coffee mode.

Upon pressing the first Americano pushbutton 73, the assembly of the water-supplying device 2, the flow control unit 3, and the dispensing member 5 is controlled to operate in a two-stage Americano coffee mode. At the first stage, the assembly of the water-supplying device 2, the flow control unit 3, and the dispensing member 5 operates in the Espresso coffee mode, in which the first amount of water is sucked from the water reservoir 21 so as to brew Espresso coffee that is collected in a cup and that is the same as that obtained in the Espresso coffee mode activated via the first Espresso pushbutton 71. Subsequently, i.e. at the second stage, the three-way electromagnetic valve 26 is activated so as to permit water flow between the hot water inlet 261 and the secondary outlet 263 and so as to prevent water flow between the hot water inlet 261 and the main outlet 262. At this time, the pump 22 forces a second amount of water from the reservoir 21 into the water passage space 510 via a flow path of the first conduit 41, the flow control valve 23, the second conduit 42, the pump 22, the pressure relief valve 24, the third conduit 43, the heater 25, the fourth conduit 44, the three-way electromagnetic valve 26, the sixth conduit 46, and the secondary water path 34 in the flow control unit 3. Thereafter, the hot water flows through the spaces 518 defined by the inner walls 516, into the cup of brewed coffee via the discharge holes 517, thereby forming Americano coffee. Note that the hot water will not flow through the filtering member 6 during the second stage.

Upon pressing the second American pushbutton 74, the assembly of the water-supplying device 2, the flow control unit 3, and the dispensing member 5 is also controlled to operate in the Americano coffee mode. In this mode, unlike the operation resulting from actuation of the first Americano pushbutton 73, the pump 22 forces an amount of water that is double the first amount from the water reservoir 21 into the brewing space 519 at the first stage, and forces another amount of water that is double the second amount from the water reservoir 21 into the water passage space 510 at the second stage. It is noted that the amount of ground coffee beans used is also double that used in the aforesaid Americano coffee mode.

In summary, the water-supplying device 21 supplies water once during the operation of the assembly of the water-supplying device 2, the flow control unit 3, and the dispensing member 5 in the Espresso coffee mode, and twice during the operation of the assembly in the Americano coffee mode. In the Americano mode, the first supply of water outputs brewed Espresso coffee, while the second supply of water outputs hot water.

If the pump 22 is stopped during water flow from the water reservoir 21 to the heater 25, the water in the third conduit 43 will flow back into the water reservoir 21 via the pressure relief valve 24 and the flow return tube 27.

With this invention thus explained, it is apparent that various modifications and variations can be made without departing from the spirit and scope of this invention. It is therefore intended that this invention be limited only as indicated by the appended claims.

I claim:

1. An electric coffee maker comprising:
    a base including a housing and a support frame that is disposed within said housing;
    a water supply device disposed within said base and including a heater that is supported on said support frame and that is formed with a hot water outlet, and a three-way electromagnetic valve that has a hot water inlet, a main outlet, and a secondary outlet, said heater being adapted to heating and supplying water to said three-way electromagnetic valve;
    a flow control unit mounted on said support frame and having a main water path that is in fluid communication with said main outlet in said three-way electromagnetic valve, and a secondary water path that is in fluid communication with said secondary outlet in said three-way electromagnetic valve;
    a dispensing member mounted removably on and under said flow control unit and including a vertical outer surrounding wall and a partition unit for defining a brewing space and a water passage space within said surrounding wall;
    a filtering member mounted removably within said brewing space in said dispensing member and adapted to receive ground coffee beans therein; and
    a selection unit for controlling said three-way electromagnetic valve so as to activate an assembly of said water-supplying device, said flow control unit, and said dispensing unit to operate in a selected one of a single-stage Espresso coffee mode, in which hot water flows from said heater into said filtering member via said main water path so as to discharge brewed coffee from a lower end of said dispensing member into a cup, and a two-stage Americano coffee mode, in which hot water flows from said heater into said water passage space in said dispensing member via said secondary water path so as to discharge the hot water from said coffee maker into the cup of brewed coffee formed in the Espresso mode.

2. The electric coffee maker as claimed in claim 1, wherein said support frame has a vertical frame portion and a horizontal frame portion that is connected fixedly to and that extends forward from an upper end of said vertical frame portion, said horizontal frame portion having a top surface, on which said heater is mounted fixedly, said water-supplying device further including a water reservoir that is mounted fixedly on said vertical frame portion and that is adapted to receive water therein so as to supply the water into said heater.

3. The electric coffee maker as claimed in claim 2, wherein said water-supplying device further includes a pump that is adapted to force the water from said water reservoir into said heater, and a flow control valve for controlling amount of water flowing from said water reservoir into said pump.

4. The electric coffee maker as claimed in claim 3, wherein said water-supplying device further includes a pressure relief valve that is installed on said pump, and a flow return pipe that interconnects and that is in fluid communication with said pressure valve and said water reservoir.

5. The electric coffee maker as claimed in claim 1, wherein said partition unit includes a plurality of vertical inner walls, which are arranged in a circle surrounded by said outer surrounding wall, each adjacent pair of said inner walls being spaced apart from each other, said dispensing member further including:
    a horizontal ring plate having an outer periphery that is formed integrally with a lower end of said outer surrounding wall, and an inner periphery that is formed integrally with lower ends of said inner walls; and
    a bowl having an annular curved upper bowl portion that extends inwardly and downwardly from said inner periphery of said ring plate, a circular tube portion that has an open upper end, and a bottom end wall for defining a closed bottom end of said circular tube portion, said upper end of said circular tube portion being formed integrally with a lower end of said upper bowl portion, said bottom end wall being formed with at least one discharge hole therethrough.

6. The electric coffeemaker as claimed in claim 1, further comprising a conduit unit that includes:
    a first conduit for interconnecting said water reservoir and said flow control valve;
    a second conduit for interconnecting said flow control valve and said pump;
    a third conduit for interconnecting said pressure relief valve and said heater;
    a fourth conduit for interconnecting said heater and said three-way electromagnetic valve, said fourth conduit being in fluid communication with said hot water outlet in said heater and said hot water inlet in said three-way electromagnetic valve;
    a fifth conduit for interconnecting said three-way electromagnetic valve and said flow control unit, said fifth conduit being in fluid communication with said main outlet in said three-way electromagnetic valve and said main water path in said flow control unit; and
    a sixth conduit for interconnecting said three-way electromagnetic valve and said flow control unit, said sixth conduit being in fluid communication with said secondary outlet in said three-way electromagnetic valve and said secondary water path in said flow control unit.

7. The electric coffee maker as claimed in claim 1, wherein said selection unit includes:
    a first Espresso pushbutton mounted operably on said housing and operable to supply a first amount of water from said water reservoir and to operate said assembly in said Espresso coffee mode;
    a second Espresso pushbutton mounted operably on said housing and operable to supply an amount of water that is double the first amount from said water reservoir and to operate said assembly in said Espresso coffee mode;
    a first Americano pushbutton mounted operably on said housing and operable to supply both the first amount of water from said water reservoir at a first stage and a second amount of water at a second stage, and to operate said assembly in said Americano coffee mode; and
    a second Americano pushbutton mounted operably on said housing and operable to supply an amount of water that is double the first amount from said water reservoir at the first stage and to supply another amount of water that is double the second amount from said water reservoir and to operate said assembly in said Americano coffee mode.

\* \* \* \* \*